United States Patent [19]

Lin

[11] Patent Number: 5,685,093

[45] Date of Patent: Nov. 11, 1997

[54] BICYCLE SHOE

[76] Inventor: Wen-Hwa Lin, No.816, Chan Shen Rd., Tiah Shen Tsun, Wei Pu Hsiang, Taichung Hsien, Taiwan

[21] Appl. No.: 623,950

[22] Filed: Mar. 29, 1996

[51] Int. Cl.⁶ .................................. A43B 5/14; G05G 1/14
[52] U.S. Cl. ........................ 36/131; 74/594.4; 74/594.6
[58] Field of Search ........................... 36/131; 74/594.6, 74/594.4

[56] References Cited

U.S. PATENT DOCUMENTS

| | | | |
|---|---|---|---|
| 3,744,160 | 7/1973 | Dymond | 36/144 |
| 4,506,463 | 3/1985 | Chassaing | 36/131 |
| 4,875,300 | 10/1989 | Kazz | 36/114 X |
| 5,131,291 | 7/1992 | Beyl | 36/131 X |
| 5,363,526 | 11/1994 | Okajima | 36/131 X |
| 5,363,573 | 11/1994 | Kilgore et al. | 36/131 |
| 5,446,977 | 9/1995 | Nagano et al. | 36/131 |
| 5,526,589 | 6/1996 | Jordan | 36/67 R X |

FOREIGN PATENT DOCUMENTS 2252029  7/1992  United Kingdom ............... 36/131

*Primary Examiner*—Ted Kavanaugh
*Attorney, Agent, or Firm*—Varndell Legal Group

[57] ABSTRACT

A bicycle shoe which includes a sole having a top recess and a bottom recess aligned at two opposing sides and a plurality of through holes through the top recess and the bottom recess, at least one locating plate longitudinally slidably mounted in the top recess and then fixed to the through holes in place by screw bolts to hold a positioning plate in the bottom recess for securing to a bicycle pedal.

7 Claims, 10 Drawing Sheets

5,685,093

BICYCLE SHOE

BACKGROUND AND SUMMARY OF THE INVENTION

The present invention relates to a bicycle shoes specifically designed for use in riding bicycles, and relates more particularly to such a bicycle shoe which can be adjustably mounted with any of a variety of positioning plates for securing to different bicycle pedals.

When riding a bicycle at a high speed, the shoes may slip from the pedals. In order to firmly secure the shoes to the pedals when riding a racing bicycle, the shoes must be specially designed. Various bicycle shoes have been developed having a positioning plate at the bottom side of the sole for securing to the pedal in place. There are various positioning plates including plastic positioning plates, metal positioning plates, and magnetic positioning plates have been designed for securing bicycle shoes to different bicycle pedals. However, these positioning plates fit different bicycle shoes, that is, a bicycle shoe can only be mounted with a particular positioning plate for securing to a particular bicycle pedal.

The present invention has been accomplished to provide a bicycle shoe which can be adjustably mounted with any of a variety of positioning plates for securing to different bicycle pedals. To achieve this object, there is provided a bicycle shoe comprised of a sole having a top recess and a bottom recess aligned at two opposing sides and a plurality of through holes through the top recess and the bottom recess, at least one locating plate longitudinally slidably mounted in the top recess and then fixed to the through holes in place by screw bolts to hold a positioning plate in the bottom recess for securing to a bicycle.

DETAILED DESCRIPTION OF THE PREFERRED EMBODIMENT

Figure 1:
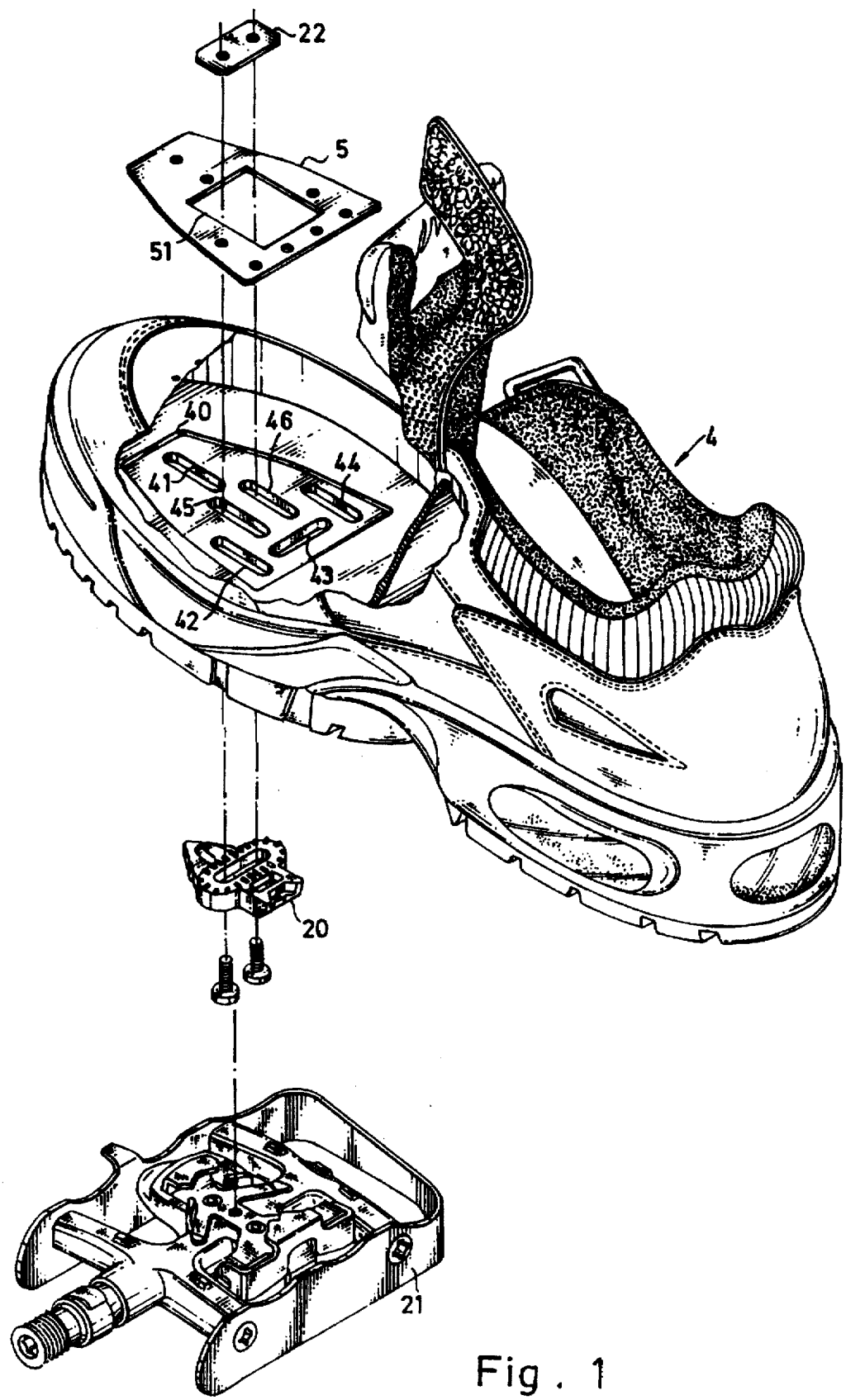
FIG. 1 is an exploded view of one embodiment of the present invention matched with a metal positioning plate.
Figure 2:
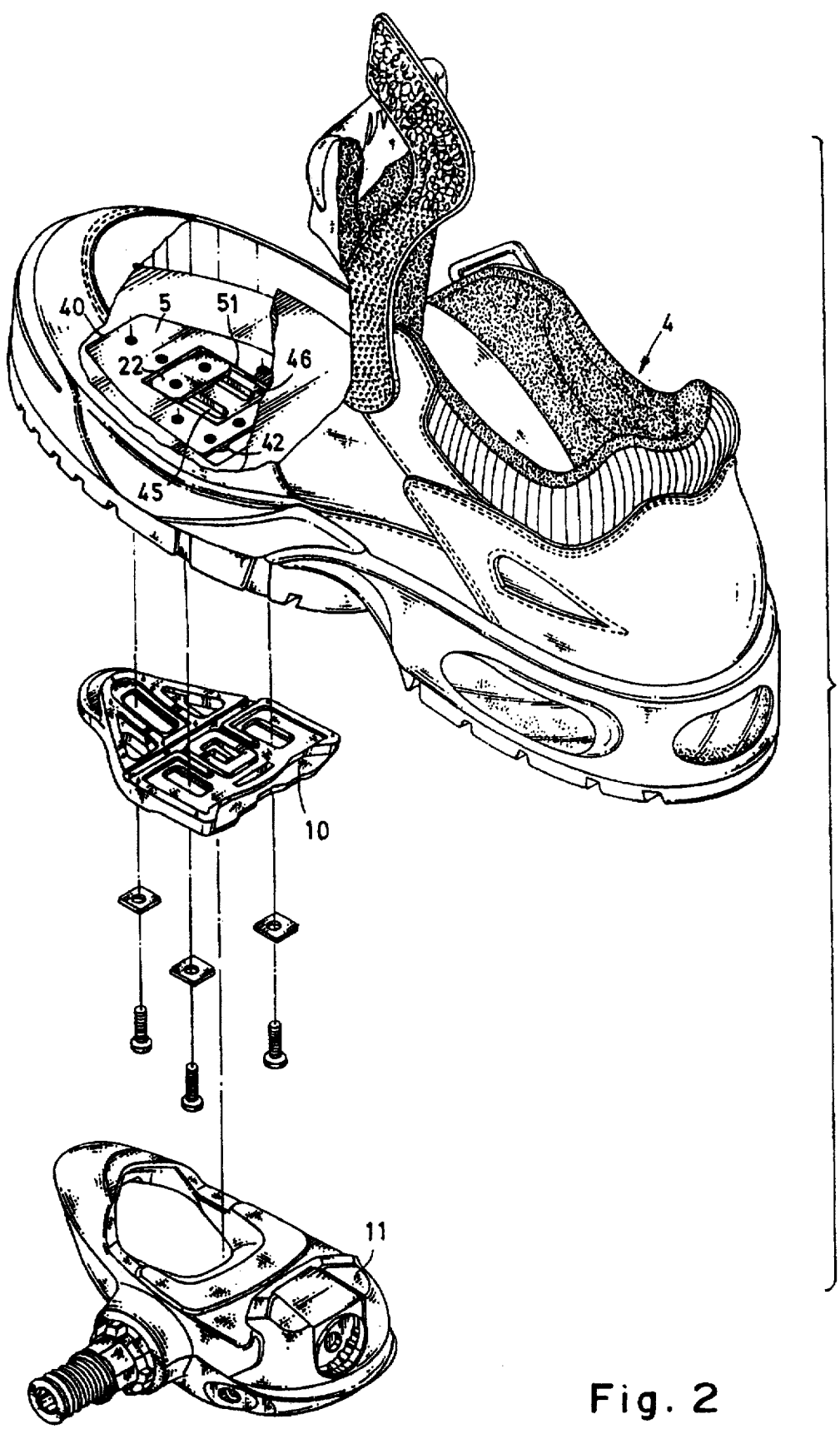
FIG. 2 shows the embodiment of FIG. 1 matched with a plastic positioning plate.
Figure 3:
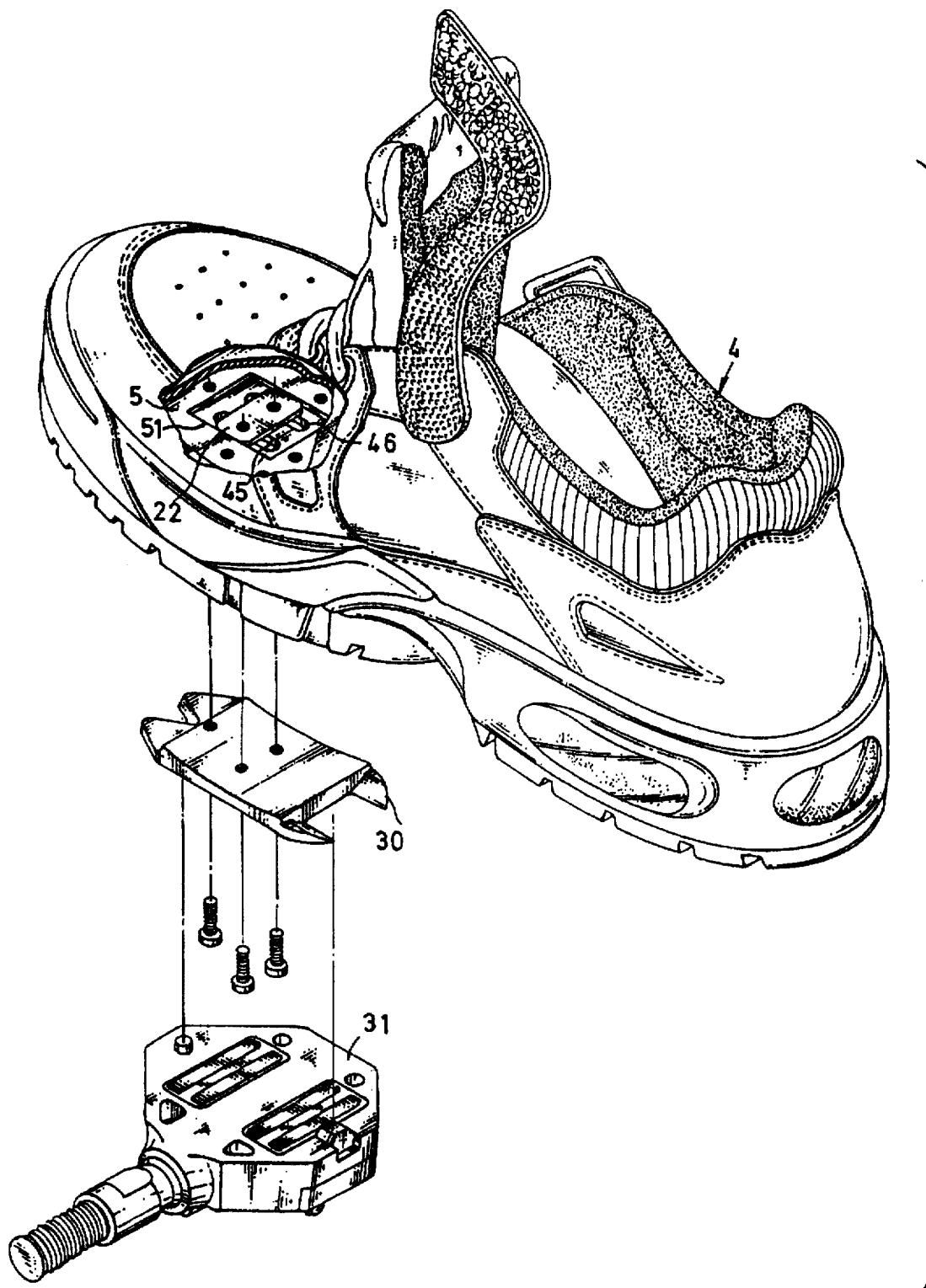
FIG. 3 shows the embodiment of FIG. 1 matched with a magnetic positioning plate.
Figure 4:
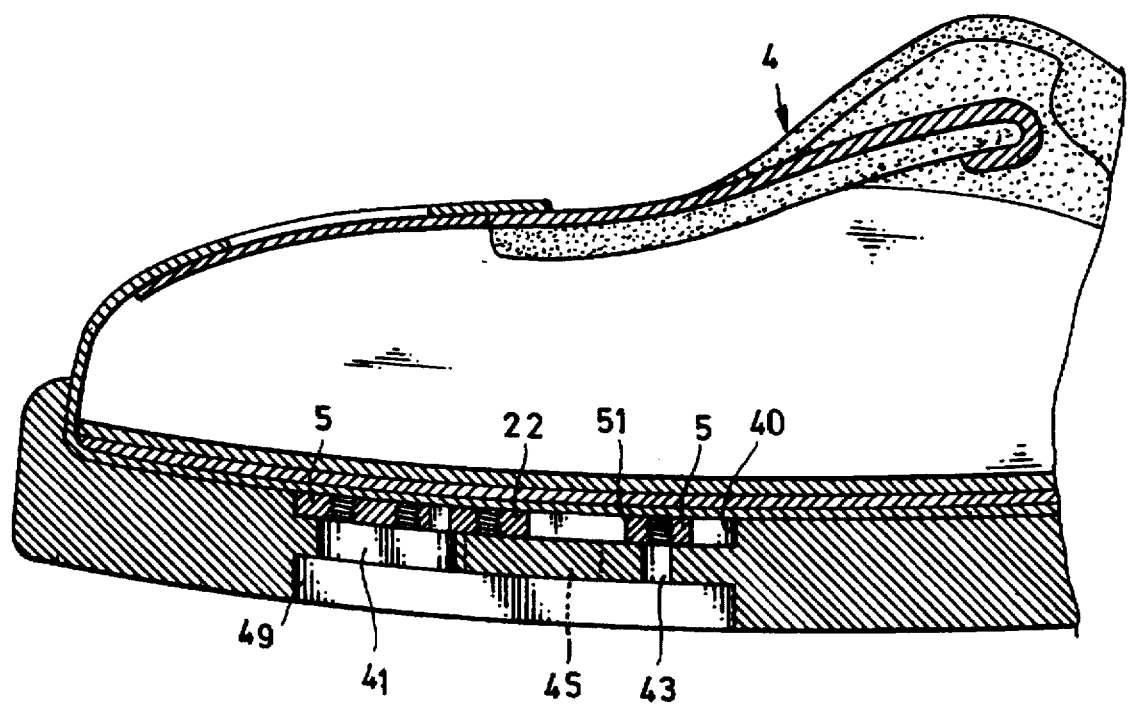
FIG. 4 is a sectional assembly view of the embodiment of FIG. 1.

Referring to Figures from 1 to 4, the bicycle shoe, referenced by 4, has a top recess 40 and a bottom recess 49 respectively disposed on the top side and bottom side of the sole, a plurality of first elongated slots 41, 42, 43 44 made through the top recess 40 and the bottom recess 49 around the border, and two parallel second solts 45, 46 made through the top recess 40 the bottom recess 49 and surrounded by the first elongated slots 41, 42, 43, 44. A first locating plate 5 is slidably mounted within the top recess 40 and fixed to the first elongated slots 41, 42, 43, 44 by screw bolts. A second locating plate 22 is mounted in the top recess 40 and moved within the center opening 51 of the first locating plate 5, and then fixed to the second elongated slots 45, 46 by screw bolts. The first locating plate 5 and the second locating plate 22 must have a plurality of screw holes so that they can be fixed to the sole of the shoe 4 by screw bolts. A positioning plate for example a plastic positioning plate 10, metal positioning plate 20, or magnetic positioning plate 30 is mounted in the bottom recess 49 and secured to the first locating plate 5 or the second locating plate 22. The positioning plate 10, 20, 30 are designed for securing to different bicycle pedals 11, 21, 31. When the screw bolts are loosened, the first locating plate 5 and the second locating plate 22 can be respectively moved in the longitudinal direction within the top recess 40 and then fixed with the positioning plate 10, 20, 30 at the desired location.

Figure 5:
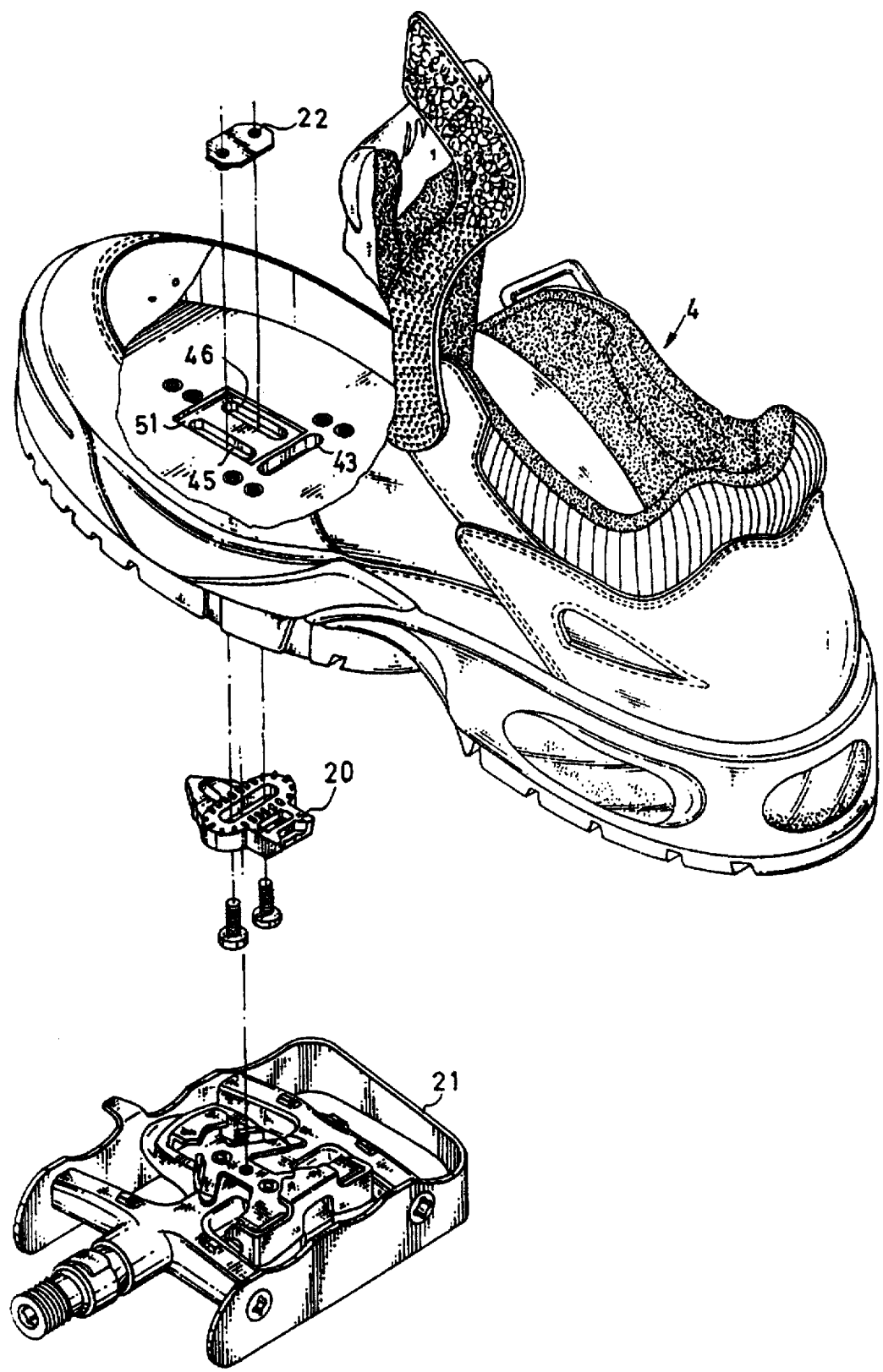
FIG. 5 is an exploded view of a second embodiment of the present invention matched with a metal positioning plate.
Figure 6:
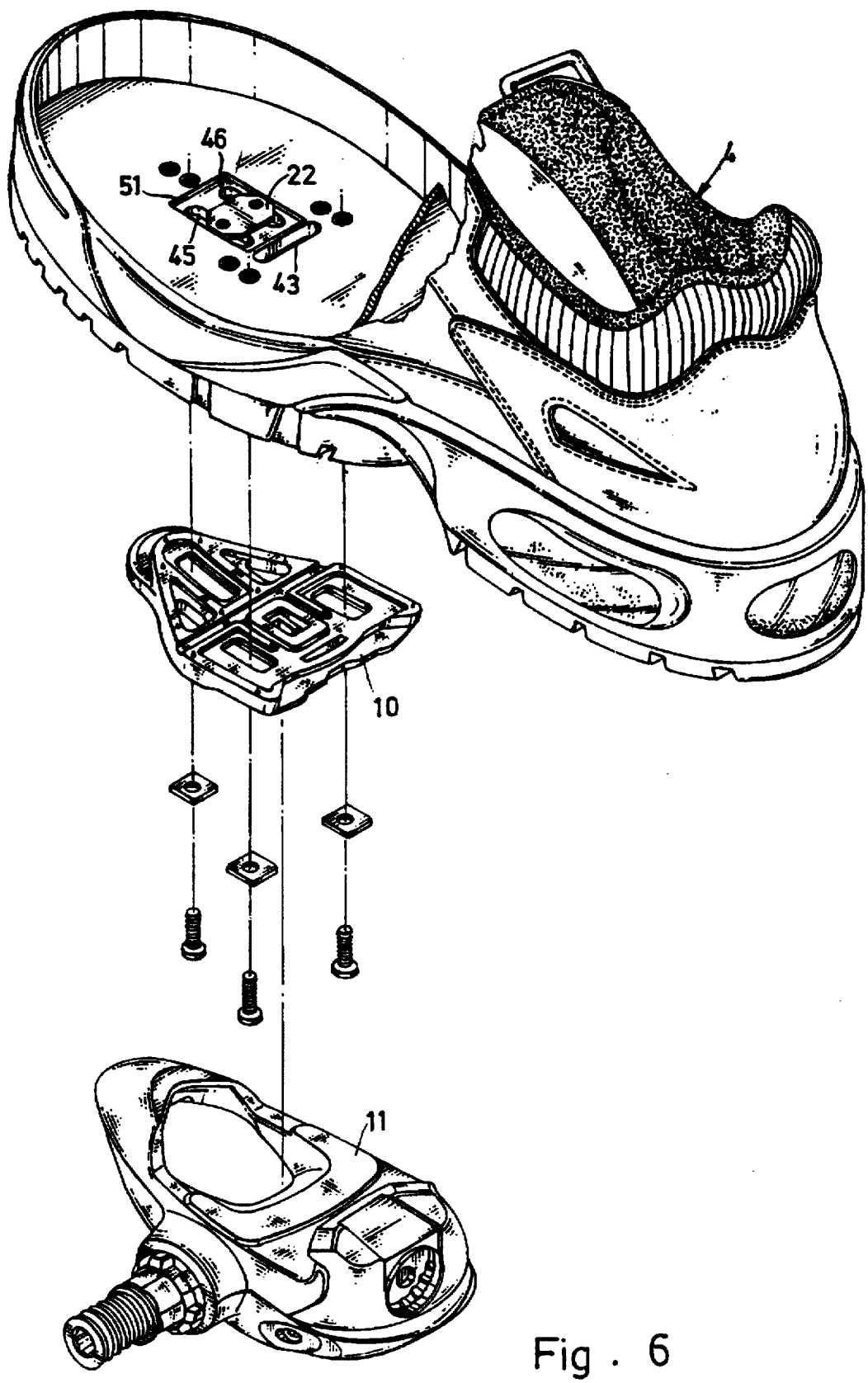
FIG. 6 shows the embodiment of FIG. 5 matched with a plastic positioning plate.
Figure 7:
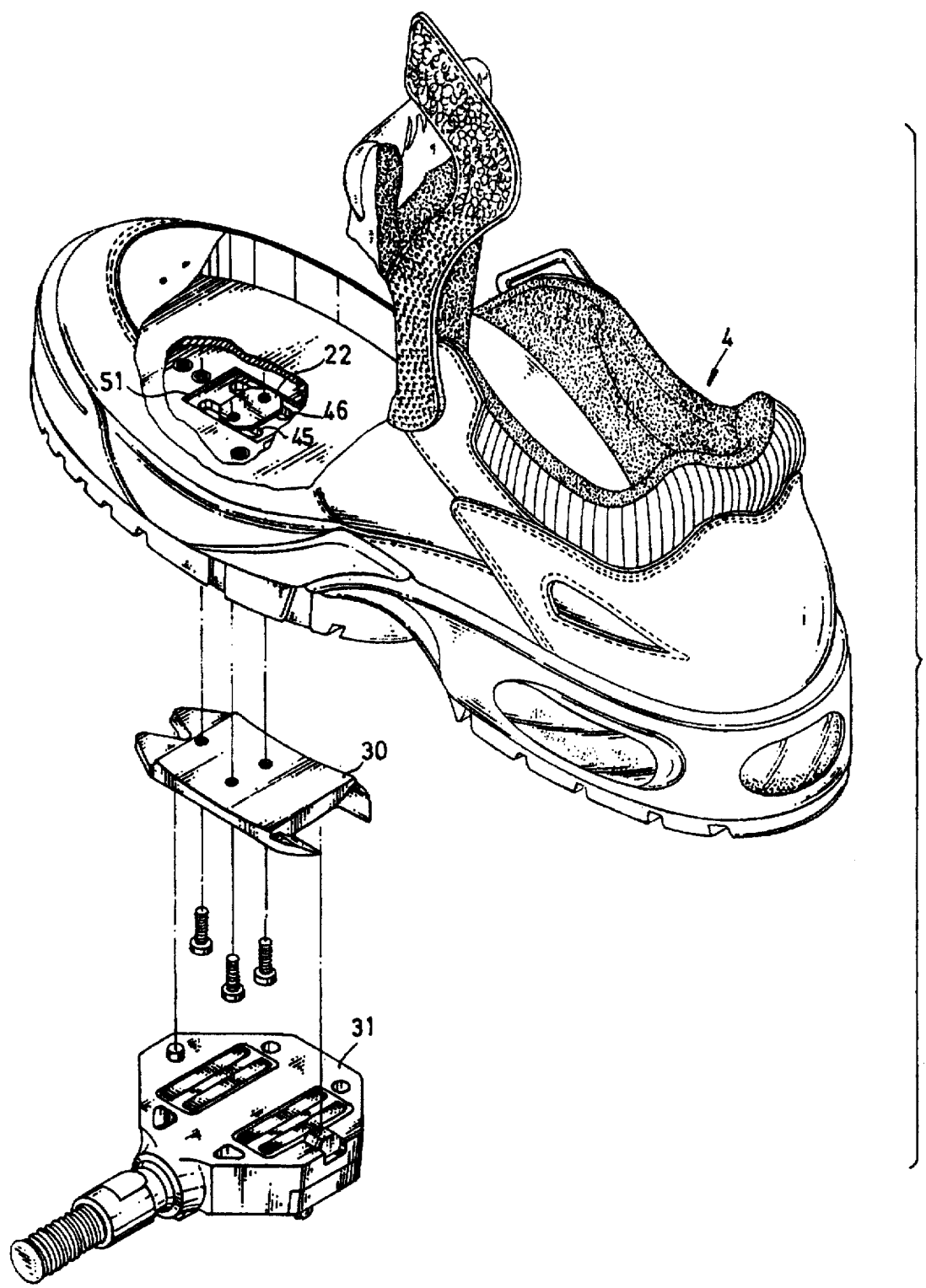
FIG. 7 shows the embodiment of FIG. 5 matched with a magnetic positioning plate.

FIGS. 5, 6, and 7 show an alternate form of the present invention, in which the first locating plate is directly molded on the sole of the shoe 4 in a flush manner. Furthermore, the first elongated slots 41, 42, 44 may be replaced by respective row of screw holes.

Figure 8:
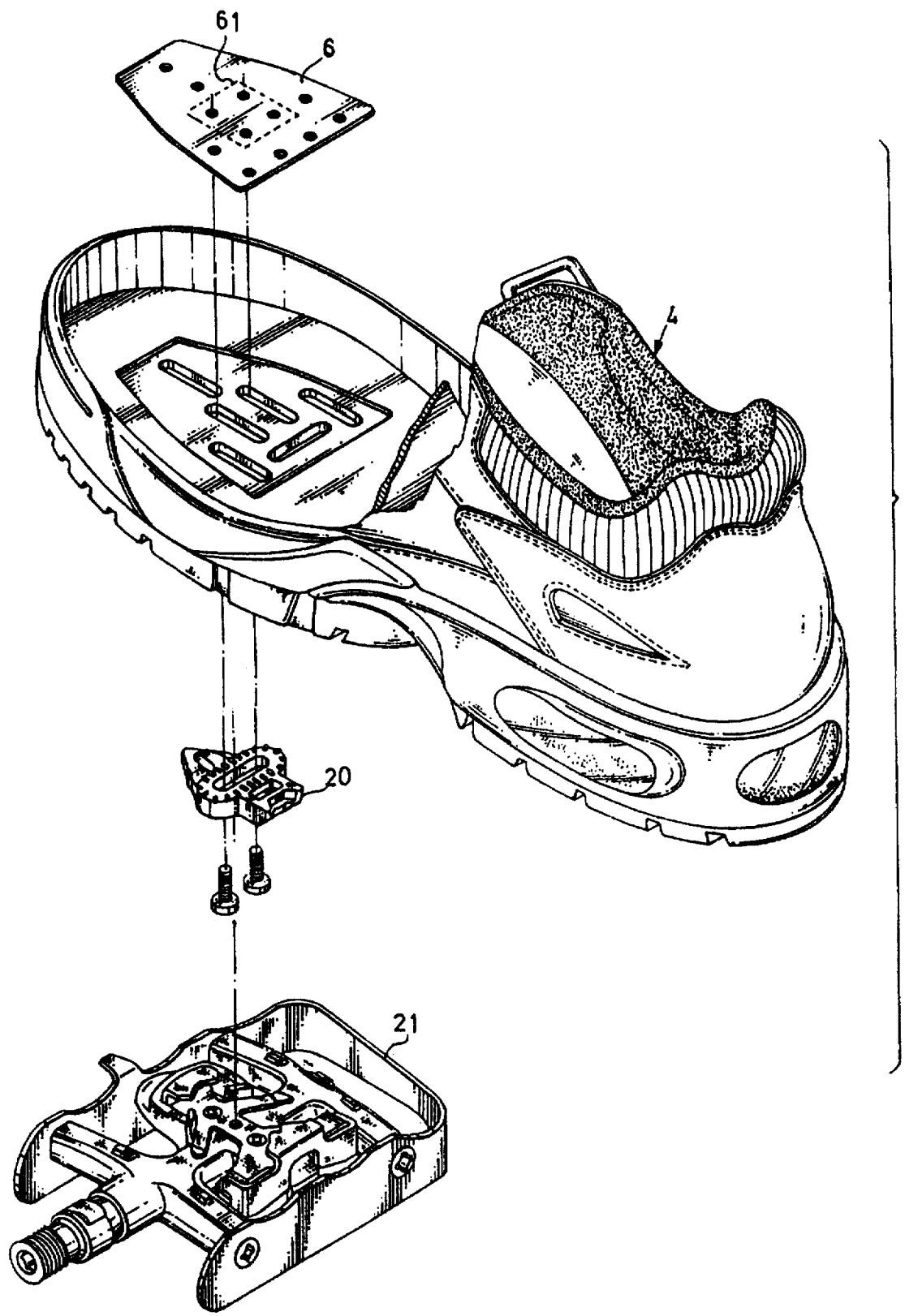
FIG. 8 is an exploded view of a third embodiment of the present invention matched with a metal positioning plate.
Figure 9:
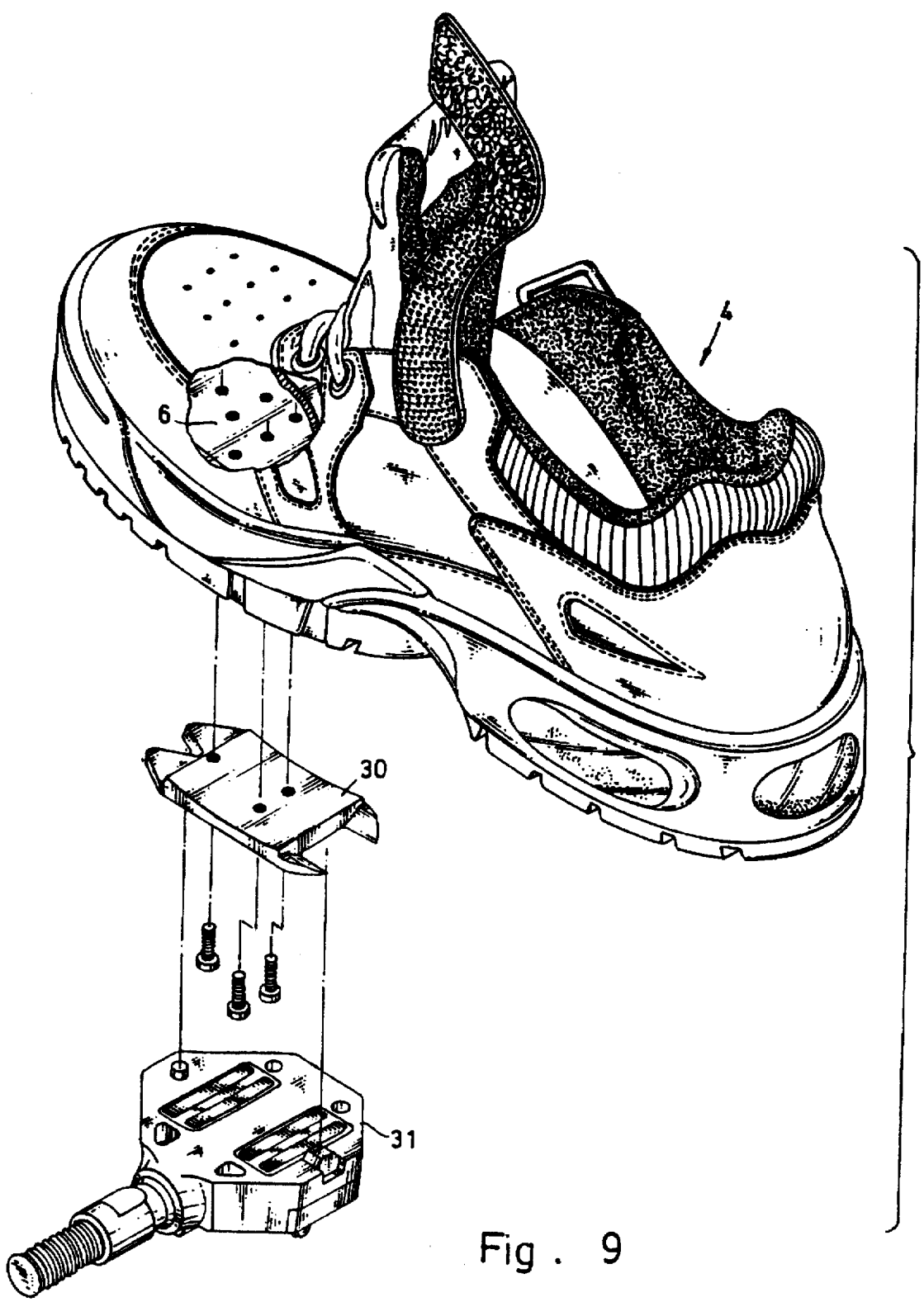
FIG. 9 shows the embodiment of FIG. 8 matched with a magnetic positioning plate.
Figure 10:
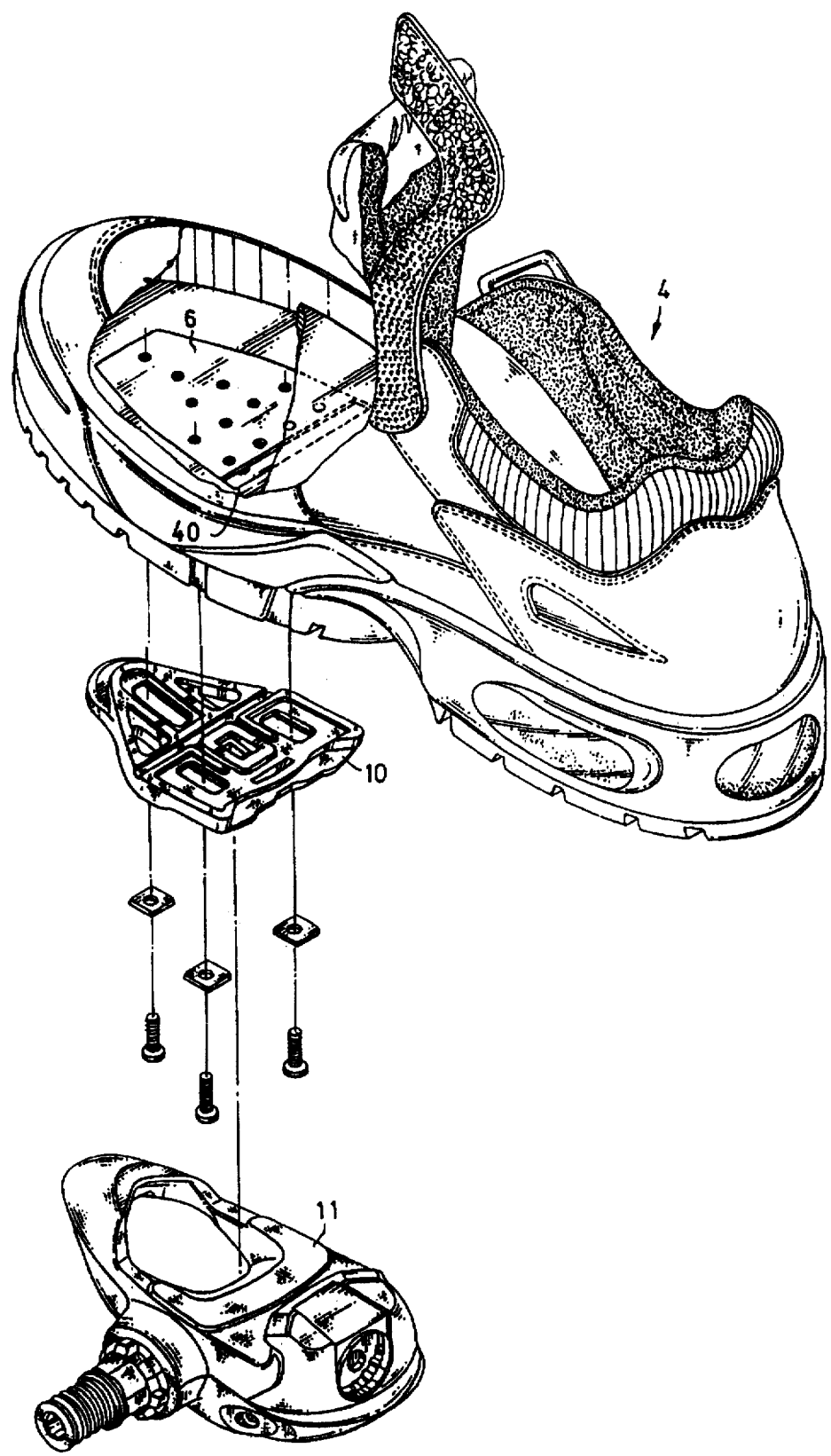
FIG. 10 shows the embodiment of FIG. 8 matched with a plastic positioning plate.

FIGS. 8, 9, and 10 show another alternate form of the present invention, in which only one locating plate 6 is used and fixed to the sole of the shoe 4 by screw bolts to hold the plastic positioning plate 10, metal positioning plate 20, or magnetic positioning plate 30 in place. The locating plate 6 has at least two longitudinally aligned screw holes 61 corresponding to each of the first and second elongated slots of the shoe 4, so that the position of the locating plate 6 can be relatively adjusted in the longitudinal direction. The locating plate 6 can also be directly molded on the sole of the shoe 4 in a flush manner.

I claim:

1. A bicycle shoe comprising a sole and a locating plate, said locating plate having a plurality of threaded holes including a top hole, two central holes, a left hole and a right hole; said sole having through holes aligned with said plurality of threaded holes of said locating plate, said locating plate adapted to secure positioning plates of different configurations thereto, said positioning plates for securing said shoe to a bicycle pedal in a releasable manner and including first, second and third positioning plates, said first positioning plate having two through holes that can be aligned in a longitudinally slidably arrangement relative to said shoe with said two central thread holes of said locating plate, so that a screw can pass through said through holes of said first positioning plate and said through holes of said sole and be tightened in said two central thread holes of said locating plate, said second positioning plate having three through holes that can be aligned in a longitudinally slidably arrangement relative to said shoe with said top, said right and said left thread holes of said locating plate, so that a screw can pass through said holes of said second positioning plate and said through holes of said sole and be tightened in said top, said right and said left thread holes of said locating plate, and said third positioning plate having three through holes that can be aligned with said top and said two central thread holes of said locating plate, so that a screw can pass through said holes of said third positioning plate and said through holes of said sole and be tightened in said top and said two central thread holes of said locating plate, wherein said sole has a top recess, a bottom recess arranged below said top recess, and a middle portion arranged between said upper and said bottom recesses, said through holes of said sole are arranged in said middle portion, said locating plate is longitudinally slidably mounted in said top recess, and said first positioning plate is located in said bottom recess.

2. A bicycle shoe according to claim 1, wherein said locating plate includes first and second locating plates that can be slidably arranged relative to one another, said two central thread holes are provided in said first locating plate; and said top, said right, and said left thread holes are provided in said second locating plate.

3. A bicycle shoe comprising a sole and a locating plate, said locating plate having a plurality of threaded holes including a top hole, two central holes, a left hole and a right hole; said sole having through holes aligned with said plurality of threaded holes of said locating plate, said locating plate adapted to secure positioning plates of different configurations thereto, said positioning plates for securing said shoe to a bicycle pedal in a releasable manner and including first, second and third positioning plates, said first positioning plate having two through holes that can be aligned in a longitudinally slidably arrangement relative to said shoe with said two central thread holes of said locating plate, so that a screw can pass through said through holes of said first positioning plate and said through holes of said sole and be tightened in said two central thread holes of said locating plate, said second positioning plate having three through holes that can be aligned in a longitudinally slidably arrangement relative to said shoe with said top, said right and said left thread holes of said locating plate, so that a screw can pass through said holes of said second positioning plate and said through holes of said sole and be tightened in said top, said right and said left thread holes of said locating plate, and said third positioning plate having three through holes that can be aligned with said top and said two central thread holes of said locating plate, so that a screw can pass through said holes of said third positioning plate and said through holes of said sole and be tightened in said top and said two central thread holes of said locating plate, wherein said locating plate is directly molded on said sole of said shoe, and said locating plate includes first and second locating plates that can be slidably arranged relative to one another, said two central thread holes are provided in said first locating plate; and said top, said right, and said left thread holes are provided in said second locating plate.

4. A bicycle shoe comprising a sole and a locating plate, said locating plate having a plurality of threaded holes including a top hole, two central holes, a left hole and a right hole; said sole having through holes aligned with said plurality of threaded holes of said locating plate, said locating plate adapted to secure positioning plates of different configurations thereto, said positioning plates for securing said shoe to a bicycle pedal in a releasable manner and including first, second and third positioning plates, said first positioning plate having two through holes that can be aligned in a longitudinally slidably arrangement relative to said shoe with said two central thread holes of said locating plate, so that a screw can pass through said through holes of said first positioning plate and said through holes of said sole and be tightened in said two central thread holes of said locating plate, said second positioning plate having three through holes that can be aligned in a longitudinally slidably arrangement relative to said shoe with said top, said right and said left thread holes of said locating plate, so that a screw can pass through said holes of said second positioning plate and said through holes of said sole and be tightened in said top, said right and said left thread holes of said locating plate, and said third positioning plate having three through holes that can be aligned with said top and said two central thread holes of said locating plate, so that a screw can pass through said holes of said third positioning plate and said through holes of said sole and be tightened in said top and said two central thread holes of said locating plate, wherein said sole has a top recess, a bottom recess arranged below said top recess, and a middle portion arranged between said upper and said bottom recesses, said through holes of said sole are arranged in said middle portion, said locating plate is longitudinally slidably mounted in said top recess, and said second positioning plate is located in said bottom recess.

5. A bicycle shoe according to claim 1, wherein said locating plate includes first and second locating plates that can be slidably arranged relative to one another, said two central thread holes are provided in said first locating plate; and said top, said right, and said left thread holes are provided in said locating plate.

6. A bicycle shoe comprising a sole and a locating plate, said locating plate having a plurality of threaded holes including a top hole, two central holes, a left hole and a right hole; said sole having through holes aligned with said plurality of threaded holes of said locating plate, said locating plate adapted to secure positioning plates of different configurations thereto, said positioning plates for securing said shoe to a bicycle pedal in a releasable manner and including first, second and third positioning plates, said first positioning plate having two through holes that can be aligned in a longitudinally slidably arrangement relative to said shoe with said two central thread holes of said locating plate, so that a screw can pass through said through holes of said first positioning plate and said through holes of said sole and be tightened in said two central thread holes of said locating plate, said second positioning plate having three through holes that can be aligned in a longitudinally slidably arrangement relative to said shoe with said top, said right and said left thread holes of said locating plate, so that a screw can pass through said holes of said second positioning plate and said through holes of said sole and be tightened in said top, said right and said left thread holes of said locating plate, and said third positioning plate having three through holes that can be aligned with said top and said two central thread holes of said locating plate, so that a screw can pass through said holes of said third positioning plate and said through holes of said sole and be tightened in said top and said two central thread holes of said locating plate, wherein said sole has a top recess, a bottom recess arranged below said top recess, and a middle portion arranged between said upper and said bottom recesses, said through holes of said sole are arranged in said middle portion, said locating plate is longitudinally slidably mounted in said top recess, and said third positioning plate is located in said bottom recess.

7. A bicycle shoe according to claim 6, wherein said locating plate includes first and second locating plates that can be slidably arranged relative to one another, said two central thread holes are provided in said first locating plate; and said top, said right, and said left thread holes are provided in said locating plate.

* * * * *